United States Patent [19]
Johnson

[11] Patent Number: 6,026,062
[45] Date of Patent: Feb. 15, 2000

[54] COMPACT DISC FOR SCHEDULED PLAYING OF AUDIO TRACKS

[75] Inventor: Robert Henry Johnson, Lakewood, Wash.

[73] Assignee: JBS Enterprises, L.L.C., Tacoma, Wash.

[21] Appl. No.: 09/070,532

[22] Filed: Apr. 30, 1998

Related U.S. Application Data

[62] Division of application No. 08/784,450, Jan. 16, 1997, Pat. No. 5,872,747.

[51] Int. Cl.[7] ................................................... G11B 17/22
[52] U.S. Cl. ............................................ 369/33; 369/275.3
[58] Field of Search ............................... 369/33, 275.3, 369/275.2, 32, 47, 54, 58, 30; 386/126

[56] References Cited

U.S. PATENT DOCUMENTS

| | | | |
|---|---|---|---|
| 4,871,903 | 10/1989 | Carrell | 235/375 |
| 5,001,689 | 3/1991 | Baas et al. | 369/33 |
| 5,594,709 | 1/1997 | Nagano et al. | 369/32 |
| 5,745,459 | 4/1998 | Inokuchi et al. | 369/54 |
| 5,808,974 | 9/1998 | Jamail | 369/32 |

*Primary Examiner*—Tan Dinh
*Attorney, Agent, or Firm*—Christensen O'Connor Johnson & Kindness PLLC

[57] ABSTRACT

Disclosed is an audio compact disc that includes a number of audio tracks, at least a portion of which are to be played at predetermined times when the audio disc is installed in a compact disc jukebox or similar player. Stored on the compact disc is a value indicating that at least a portion of the audio tracks are to be played at predetermined times. The stored value also specifies a predetermined sequence or play schedule that is to be used with the compact disc. When the compact disc is installed in a compact disc jukebox, the stored value is accessed by the jukebox controller and causes audio tracks that are scheduled for playing at predetermined times to be played at that time or immediately after any audio track that is being played at the predetermined time.

17 Claims, 6 Drawing Sheets

COMPACT DISC FOR SCHEDULED PLAYING OF AUDIO TRACKS

CROSS-REFERENCE TO RELATED APPLICATIONS

This application is a divisional of application Ser. No. 08/784,450, filed Jan. 16, 1997, now U.S. Pat. No. 5,872,747. Priority from the filing date of which is hereby claimed under 35 U.S.C. § 1.20.

FIELD OF THE INVENTION

The present invention relates to disc storage and selection players, and in particular, to jukeboxes containing disc players.

BACKGROUND OF THE INVENTION

Compact disc (CD) jukeboxes that store multiple CDs and allow users to select particular audio tracks on a CD for play are common. Coin-operated CD jukeboxes are found in numerous commercial establishments. A customer enters money in a coin-operated jukebox and makes one or more selections, where each selection is one audio track on one CD. Typical CD jukeboxes create a queue of selections made, and sequentially play the selections in the queue. Some jukeboxes have a background or idle mode, which becomes active when there are no selections from the queue. In the idle mode, one or more predetermined audio tracks may be played. If desired, the jukebox may be set so that the audio tracks played when in idle mode are commercials or other types of announcements.

Existing methods of playing audio commercials during idle mode have the disadvantage of only playing commercials when there are no user selections in the play queue. Typically, this occurs at the times when fewer customers are in the business establishment, such as off-peak hours. It is desirable to have a system that provides the ability to play audio commercials or announcements at predetermined times, regardless of whether user selections are on the queue.

Programming existing CD jukeboxes to play particular audio tracks during idle mode requires that a programmer or other service personnel individually program each CD jukebox. This is time consuming and uneconomical. A method of programming a jukebox to play segments on a CD in a particular sequence that does not require a programmer to have physical access to a CD jukebox is desirable. It is also desirable to achieve the playing of selected audio announcements or commercials at predetermined times without deviating substantially from the manner in which commercially available CD jukeboxes are configured and arranged. Further, it is desirable to have multiple sequences of playback so that the tracks on each individual CD that include commercials or announcements can be played at different predetermined times during selected days of the week.

SUMMARY OF THE INVENTION

In accordance with this invention, an apparatus and a computer implemented method of scheduling and playing audio tracks on a recording medium, such as audio compact discs, is provided. A sequence CD is a compact disc containing one or more audio tracks, in particular audio tracks containing commercials or announcements, that are scheduled to be played at specific predetermined times of the day. The invention maintains schedules corresponding to one or more sequence CDs, and plays the scheduled tracks at the scheduled times.

In accordance with the invention, a compact disc jukebox includes an audio CD player of the type that receives commands and sends information to attached devices, and a controller computer connected to the audio CD player. The controller computer stores schedules, an initialization program, and a sequence handler program. The schedules specify the times to play individual audio tracks on the sequence CDs. When a new audio CD is installed in the jukebox, the initialization program instructs the audio CD player to read the new audio CD and return information pertaining to the audio CD. It then determines whether an audio CD is a sequence CD. At predetermined periodic intervals, the sequence handler determines, based on a current time of day and a day of the week, whether any audio tracks on the sequence CDs are scheduled to be played at that particular time. If so, the sequence handler causes the audio CD player to play the scheduled audio track. The invention allows a sequence CD to specify a schedule that corresponds to the CD, thereby allowing flexible scheduling of audio tracks on multiple sequence CDs.

In accordance with the invention, a CD audio track index value is stored on each CD in a CD audio track index location. The CD audio track index location is an industry standard location that holds the number of audio tracks on a CD. Each sequence CD has one corresponding predetermined schedule stored in the controller computer. Sequence CDs have stored, as the CD audio track index value, a number corresponding to a schedule number, the number being outside of the normal range of CD audio track index values. During initialization of a new CD, the controller computer sends a command to the audio CD player instructing the audio CD player to read the CD audio track index value on the compact disc. In response, the audio CD player reads the CD audio track index value, and sends the value to the controller computer, which receives the value. The controller computer then determines, based on the CD audio track's index value, whether the CD is a normal audio CD or a sequence CD. This information is stored in the controller computer memory. Periodically, the controller computer, based upon a current day of the week, time of day and the CD audio track index values, determines whether one or more of the audio tracks on the sequence CDs are scheduled to be played. If one or more audio tracks are scheduled to be played at that particular time, the controller computer sends a command to the audio CD player instructing the CD player to play the scheduled audio track.

In the currently preferred embodiment of the invention, the controller computer maintains a play queue that contains an ordered list of audio tracks to be played on the audio CD player. An operator can select audio tracks to be played, and a reference to the selected track is placed on the end of the play queue. When the sequence handler determines that an audio track on a sequence CD is scheduled to be played at that time, a reference to the scheduled track is placed at the front of the play queue.

In accordance with the invention, one or more schedules associating audio tracks on the sequence CDs with times of day are stored in the controller computer memory. The schedule information is used to determine whether a scheduled audio track is associated with the current time of day. Preferably, the schedule information is stored in a nonvolatile memory. In the preferred embodiment of the invention, the schedules associate audio tracks on a sequence CD with times of a day and days of the week.

In the preferred operation of the invention, the scheduling of the sequence handler operation is independent of the playing of CD audio tracks, such that the determination by the sequence handler may occur during the playing of a CD audio track.

As will be readily appreciated from the foregoing description, a CD jukebox formed in accordance with the invention allows the use of multiple sequence CDs and multiple corresponding schedules within the CD jukebox. New sequence CDs can be installed in the jukebox without requiring reprogramming of the schedule information in the jukebox. By determining, during the playing of a CD audio track, whether a CD audio track is scheduled to be played, and placing scheduled CD audio tracks at the front of the play queue, the invention allows CD audio tracks to be scheduled and played during periods of heavy use of the jukebox, rather than merely during idle times. By utilizing a single value in the CD audio track index location to specify that a CD is a sequence CD and to further specify the corresponding predetermined schedule, the invention employs a commercially available audio CD player that reads the value at the CD audio track index location and sends this value to an external device. The invention can therefore be employed by modifying existing CD jukeboxes having such commercially available audio CD players contained therein. Conventional industry standard recording mechanisms are employed to create sequence CDs, further enhancing the economy of the present invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention is directed to an apparatus and method for controlling an audio compact disc player to play audio selections at predetermined schedules. That is, the invention controls the operation of a compact disc player so that a particular audio selection will be played at a predetermined time (e.g., a chosen day at a particular time of day). The following description describes the invention in the context of controlled interspersion of audio messages (e.g., announcements and advertisements) with customer selected audio recording in CD jukeboxes. However, it is to be understood that the invention can be employed with other systems, such as home audio systems and personal computers connected to a CD player.

Figure 1:
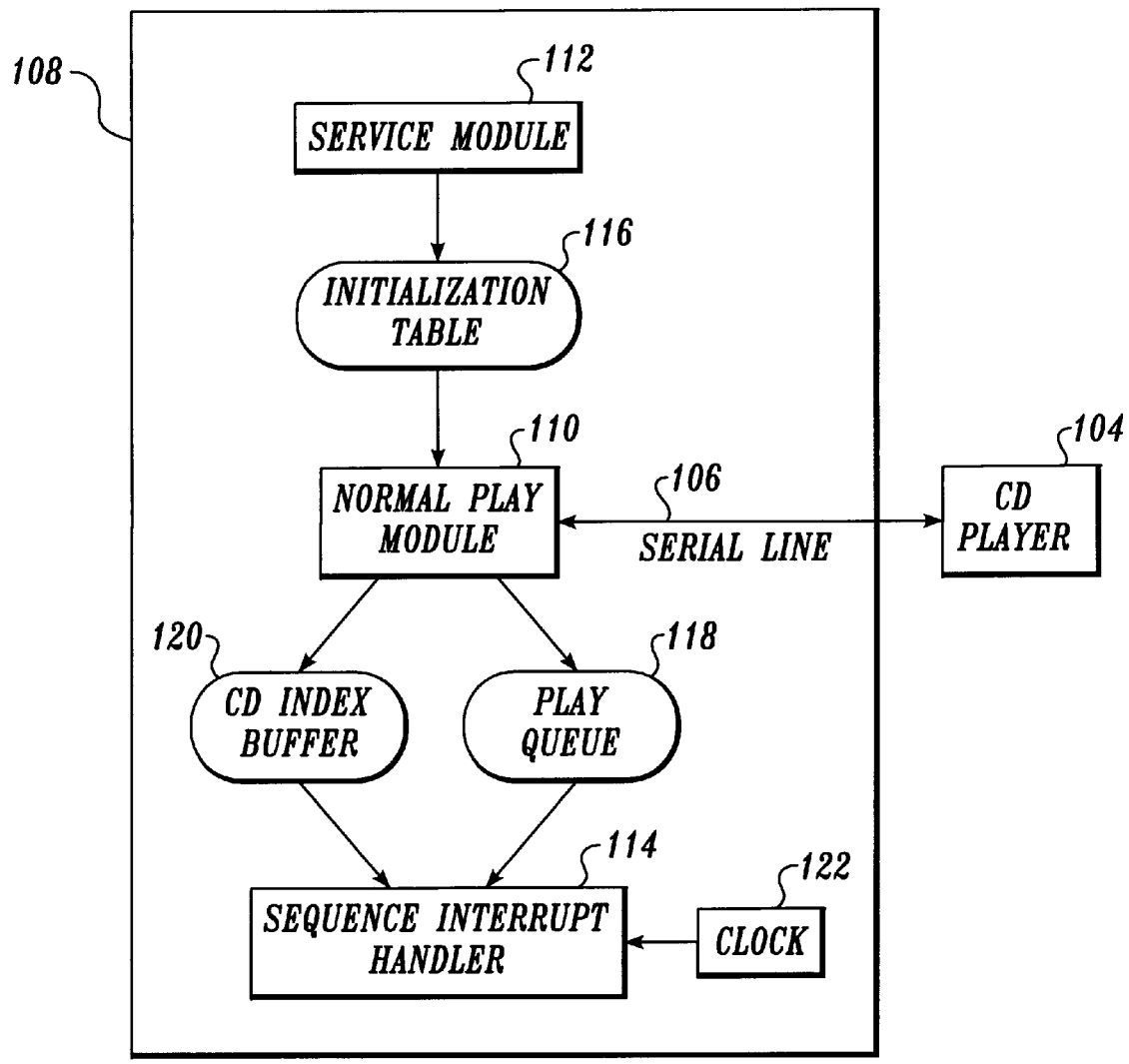
FIG. 1 is a block diagram illustrating a CD jukebox architecture in accordance with the invention.

FIG. 1 illustrates a CD jukebox architecture in accordance with the invention. The invention employs an audio CD player 104 connected to a microprocessor-based controller computer 108. The audio CD player 104 is capable of receiving command signals from a device external to the audio CD player and sending information to the external device. The audio CD player 104 is preferably connected to the controller computer 108 by a serial line 106, such as an RS-422 line. The audio CD player 104 may be a CD mechanism assembly, such as the Rowe 6103301, manufactured by Rowe International, of Grand Rapids, Mich. The Rowe 6103301 includes an optical reader/player, a mechanism control and decoder assembly, and a changer mechanism. The optical reader/player included in the Rowe CD mechanism assembly is the model CDM3 manufactured by Philips Consumer Electronics BV, of The Netherlands. The changer includes a plurality of CD slots, each slot having at most one CD contained therein. The changer allows the CD mechanism assembly to select a single CD from one of the CD slots, and to play, upon command, a desired audio track from the selected CD. The CD mechanism assembly connects, by a conventional means, to one or more speakers (not shown) for producing audio output. The CD mechanism assembly may also be a CD-ROM player connected to a personal computer and capable of playing audio CDs. A number of CD-ROM players are commercially available. CD-ROM players generally communicate through a parallel port, rather than a serial line.

The controller computer 108 is preferably a microprocessor-based computer, having a non-volatile memory such as read-only-memory (ROM), random-access-memory (RAM), a keyboard, and a display device. The ROM is preferably an erasable programmable ROM (EPROM). Preferably, at least some of the RAM is battery backed-up RAM, which utilizes a battery to maintain the contents of memory for a duration of time after power is removed from the computer 108. Battery backed-up RAM is well known to those skilled in this art, and need not be explained in further detail. It should be recognized by one skilled in this art, and others, that a controller computer 108 can include other types of memory or storage devices that maintain stored content when power is removed from the computer. The use of RAM and EPROM in the following discussion should be considered exemplary and not limiting.

The controller computer 108 includes three software modules, preferably stored in ROM: a "normal play" module 110, a "service" module 112, and a "sequence interrupt handler." As discussed in further detail below, the normal play module 110 communicates with the CD player 104 over the serial line 106, controlling the operation of the CD player. The normal play module directs the CD player 104 to play selected audio tracks on selected CDs. It further instructs the CD player to read selected CDs and return information regarding the number of audio tracks on each CD.

The service module 112 allows an operator to perform various maintenance and updating functions. These include changing the time, modifying pricing information, and entering new CDs that are to be initialized.

The sequence interrupt handler 114 is activated periodically by a timer interrupt. The timer interrupt is generated by a real-time clock component 122. As discussed in further detail below, the sequence interrupt handler 114 maintains information about CDs that are specified as sequence CDs. Sequence CDs contain audio tracks and a specification of a particular sequence to apply to the CD. A sequence includes a schedule, and instructs the sequence interrupt handler of the time that each audio track is to be played. The sequence interrupt handler, in turn, uses this information to instruct the normal play module to play particular audio tracks.

The normal play module 110 maintains, in a play queue 118, a queue of CD audio tracks to be played. When a user selects an audio track on a CD to play, the normal play module 110 appends the CD slot number and audio track number of the selection to the end of the play queue 118. When the normal play module is ready to play the next audio track, it removes the first entry in the play queue 118 from the play queue, and instructs the CD player 104, by sending a command over the serial line 106, to play the designated audio track.

Figure 2:
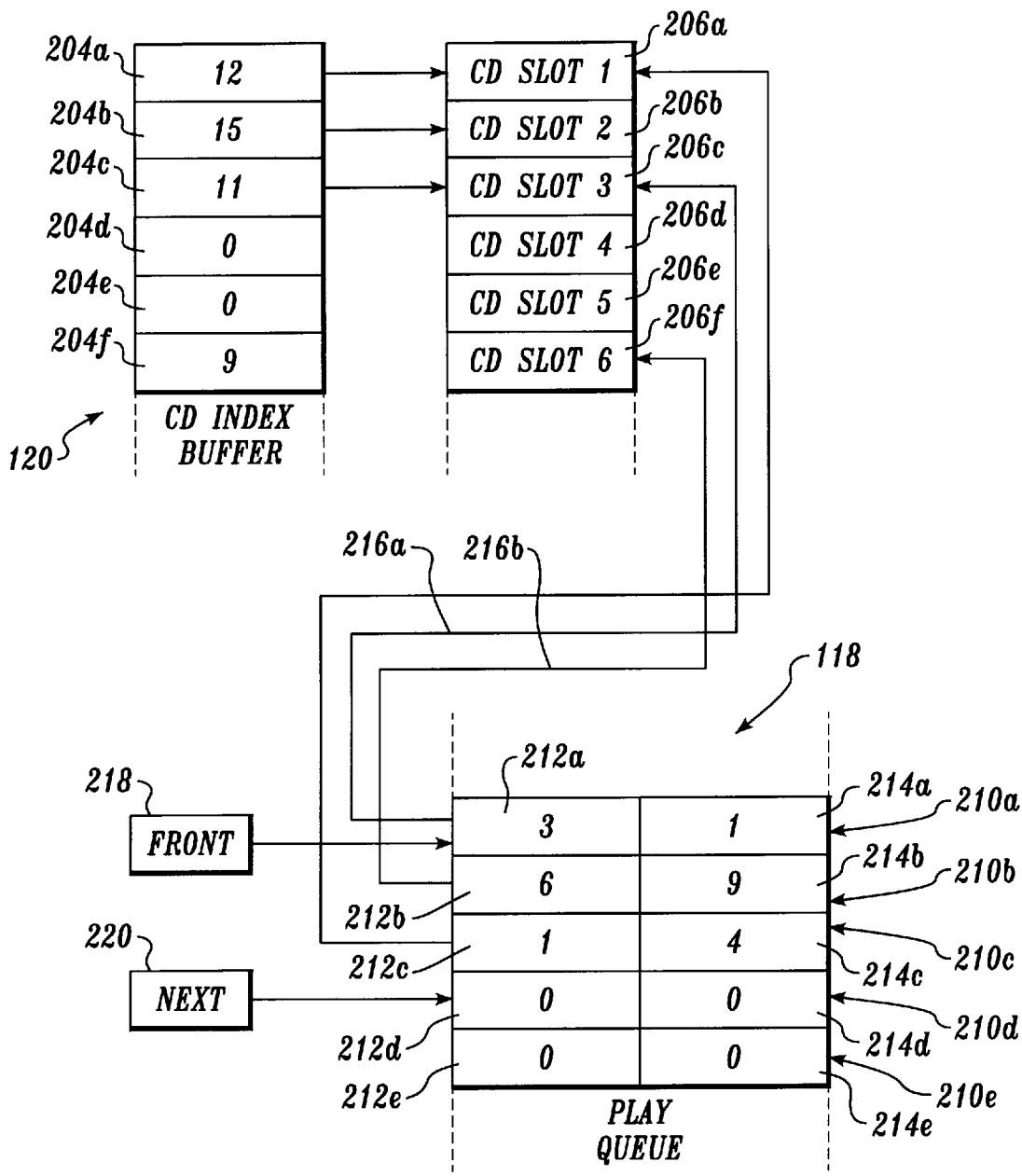
FIG. 2 illustrates buffers that are shared between the normal play module and the sequence interrupt handler.

The normal play module 110 also maintains a CD index buffer 120 that maintains information pertaining to each CD loaded into a CD slot. As is indicated in FIG. 2, the CD index buffer 120 includes entries 204a–f that are associated on a one-to-one basis with CD slots 206a–f. Each CD index buffer entry 204a–f contains a numeric value equal to the number of audio tracks on the CD in the corresponding slot 206a–f. Where a CD slot (i.e., 206d as depicted) is empty, the corresponding CD index buffer entry 204d contains a value of zero. Where a CD slot (e.g., 206e in FIG. 2) contains a sequence CD, the corresponding CD index buffer entry 204e also is zero. Thus, a value of zero in a CD index buffer entry 204a–f indicates to the normal play module 110 that a user-selectable CD does not exist in the corresponding CD slot 206a–f.

The CD index buffer 120 is maintained in a manner such that the contents are not lost when the power to the system is turned off. A preferable means of providing this capability includes storing the CD index buffer 120 in a battery backed-up RAM.

FIG. 2 also illustrates a play queue 118 that is a queue of selections to be played. Preferably the play queue is an ordered array of entries 210a–e with each entry corresponding to one audio selection (i.e., a particular track of a particular CD). In FIG. 2, each entry 210a–e in the play queue 118 includes a CD slot number (212a–e in FIG. 2) and an audio track number (214a–e). Each CD slot number 212a–e has a numeric value that references a corresponding one of the CD slots 206a–f. Each audio track number 214a–e represents a particular audio track on the CD within the CD slot 206a–f referenced by the corresponding CD slot number 212a–e. For example, as depicted in FIG. 2, the first entry 210a in the play queue 118 contains the value three in the CD slot number field 212a and the value one in the CD audio track number 214a field. As indicated by arrow 216a, this entry represents the information that the next selection to be played is audio track number one on the CD in the third CD slot 206c. Similarly, as indicated by arrow 216b, the second entry 210b in the play queue, having a CD slot number value of six and a CD audio track number value of nine, represents the information that the second selection in the play queue is the ninth audio track in the sixth CD slot 206e.

As depicted in FIG. 2, the values in play queue entry 210d are zeros. A value of zero in the CD number field 212d of a play queue entry 210d indicates that the entry having the zero, and all entries below this entry 210d, do not represent valid CD/track selections.

A preferable method of implementing a play queue 118 includes using a circular sequential queue having a pointer to the front of the queue and a pointer to the next address after the last entry in the queue. The "front" pointer 218 is incremented to remove the first entry from the queue, and the "next" pointer 220 is incremented to append an entry to the queue. The front and next pointers in the play queue "wrap around," so that when either pointer moves beyond predetermined boundaries of the buffer, it wraps around to the opposite boundary. Techniques of maintaining a circular sequential queue are well known in the art and need not be explained in further detail here. As discussed in further detail below, when the sequence interrupt handler 114 determines that an audio track on a sequence CD is scheduled to be played, the sequence interrupt handler inserts an entry containing the CD number and audio track number of the scheduled audio track at the front of the play queue 118. When the play queue is a circular sequential queue, as described above, inserting an entry at the front of the queue includes decrementing the front pointer 218 to point to the newly inserted entry.

Figure 3:
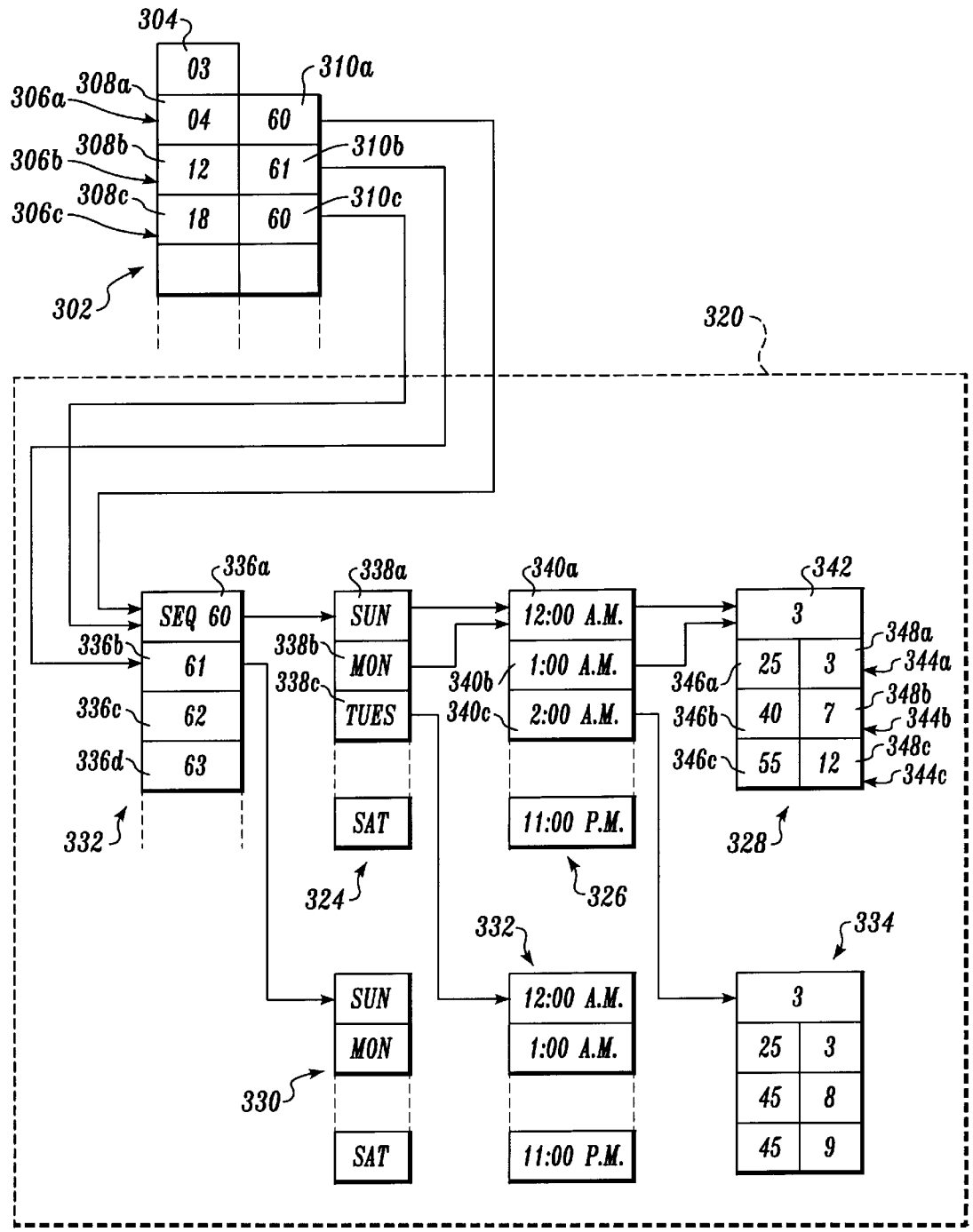
FIG. 3 illustrates tables for controlling sequencing in accordance with the invention.

FIG. 3 illustrates tables stored in the controller computer memory and used by the sequence interrupt handler 114 (FIG. 1). A sequence CD table 302 contains a list of sequence CDs that are in CD slots. At the beginning of the sequence CD table 302 is a sequence CD count field 304 containing a value representing the number of sequence CD entries 306a–c in the sequence CD table. Each sequence CD entry 306a–c includes two fields: a CD slot number field 308a–c and a sequence identifier field 310a–c. Each CD slot number field 308a–c contains a numeric value representing the CD slot 206a–f that corresponds to the sequence CD represented by the sequence CD entry a–c. For example, in FIG. 3, the value 4 in the CD slot number field 306a of the first sequence CD entry 308a indicates that the corresponding sequence CD is in the fourth CD slot 206d.

The sequence ID field 310a–c within a sequence CD entry 308a–c contains a value that identifies a particular, predetermined sequence for use with the corresponding sequence CD. As depicted, the value 60 in the sequence ID field 310a of the first sequence CD entry 308a indicates that the corresponding sequence CD is set to use sequence number 60.

Preferably, the sequence CD table 302 is maintained in a memory that retains the buffer contents when system power is turned off. Battery backed-up RAM, as discussed above, is one means for providing this capability. As discussed in further detail below, the sequence CD table 302 is used to initialize the CD player 104 upon power up.

The sequence interrupt handler 114 (FIG. 1) uses a set of sequence specification tables 320 that specify the sequence and scheduling of audio segments on a sequence CD. The sequence specification tables 320 are preferably stored within a non-volatile memory such as an EPROM. The sequence information is predetermined and does not need to be modified during the operation of the system. In the preferred embodiment, the sequence specification tables include four types of tables: a sequence table 322, a plurality of day tables 324 and 330, a plurality of hour tables 326 and 332, and a plurality of minute/selection tables 328 and 334. The sequence table 322 includes one entry for each predetermined sequence that is used by the system. Preferably, each sequence has a sequence number outside of the range of values that represent the number of audio tracks on normal audio CDs. In the arrangement shown in FIG. 3, the sequence numbers begin at 60 and extend to 99, which allows sequence table 322 to specify 40 different sequences.

Each entry in the sequence table 322 is a day table reference field (336a–d in FIG. 3). The day table reference fields contain references for locating day tables 324 and 330 that corresponds to the sequence number associated with the sequence table entry. Preferably, the day table reference field 336a–d is a two-byte address of the day table referenced. In the arrangement depicted in FIG. 3, the day table reference field 336a for the entry associated with sequence 60 contains a reference to the day table 324.

Each day table 324 and 330 includes one entry for each day of the week. An entry in the day table 324 and 330 is an hour table reference field 338a–c. An hour table reference field contains a reference for locating an hour table 326 and 332. Preferably, the hour table reference field contains a two-byte address of the hour table 326 and 332 referenced. The hour table reference fields 338a–c within a day table 324 can reference the same hour table 326 and 332 as other hour table reference fields within the same table, or they may reference different hour tables. Therefore, a day table may reference from one to seven hour tables. An hour table may be referenced by more than one day table.

An hour table 326 and 332 includes 24 entries, one for each hour of a day. An entry in the hour table 326 and 332 is a minute/selection table reference field 340a–c. The minute/selection table reference field 340a–c includes a reference for locating a minute/selection table 328 and 334. Preferably, a minute/selection table reference field 340a–c contains a two-byte address of the corresponding minute/selection table 328 and 334. In the example depicted in FIG. 3, the minute/selection table reference field 340b corresponding to the hour of one o'clock a.m. contains a reference to the corresponding minute/select table 328. The minute/selection table reference field 340c corresponding to the hour of two o'clock a.m. contains a reference to the minute/selection table 334.

In FIG. 3, the minute/selection table 328 contains information representing a schedule corresponding to the one o'clock am. time slot on Sundays. The first field of the minute/selection table 328 is a selection count field 342. The selection count field 342 contains a value representing the number of selection entries 344a–c in the minute/selection table 328. Preferably, the selection count field 342 is a one-byte field having a numeric value. As depicted in FIG. 3, the selection count field 342 in the depicted minute/selection table 328 contains a numeric value of three, indicating that three selection entries 344a–c exist in the minute/selection table.

Each selection entry 344a–c includes two fields: a minute field 346a–c and a track field 348a–c. The minute field 346a–c contains information representing the minute within the corresponding hour that the audio segment is to be played. The corresponding audio track field 348a–c within the selection entry field 344a–c contains information representing the audio track on the sequence CD that is to be played at the designated time. In FIG. 3, the depicted minute field 346a contains the value 25, indicating that the corresponding audio track is scheduled to be played at 25 minutes past the hour. The corresponding track field 348a contains the value three, indicating that the third audio track of the sequence CD is to be played. The depicted selection entry 344b contains the information that the seventh audio track is scheduled to be played at 40 minutes past the hour. The depicted selection entry 344c contains the information that the 12th audio track of the CD is to be played at 55 minutes past the hour. As depicted in FIG. 3, and discussed above, all of the selection entries 344a–c within the minute/selection table 328 refer to a one-hour time slot that begins on Sunday at one o'clock am.

As discussed in further detail below, the sequence interrupt handler 114 (FIG. 1) uses the set of sequence specification tables 320 of FIG. 3 to schedule audio tracks on the sequence CDs. Every 60 seconds, the sequence interrupt handler follows the reference links for each sequence CD to determine whether any audio tracks on the sequence CD are scheduled to played at that time. If one or more audio tracks are scheduled to be played, the CD number and track number of the scheduled audio track are placed at the front of the queue in the play queue 118 (FIG. 2). If an audio segment is currently playing, the newly inserted CD/track reference will cause the corresponding scheduled CD segment to be played upon completion of the current audio track. If no audio segments are currently being played, the newly inserted reference will cause the corresponding audio segment to be played immediately.

Although each entry in an hour table 326 and 332 contains a reference to a minute/selection table 328 and 334, it is not required that each entry 340a–c contain a reference to a unique minute/selection table 328. For example, as indicated in FIG. 3, the entry 340a corresponding to the hour of twelve o'clock midnight references the same minute/selection table 328 as the entry 340b, which corresponds to the one o'clock a.m. time slot. Similarly, the entry 338b in the day table 324 references the same hour table 326 as the entry 338a. This indicates that the schedule for a sequence CD having the sequence ID of 60 is the same on Monday as it is on Sunday and, further, that the schedule for that sequence CD is identical in the midnight and one o'clock a.m. time blocks. This configuration provides flexibility and simplifies the construction of the sequence specification tables 320.

Figure 4:
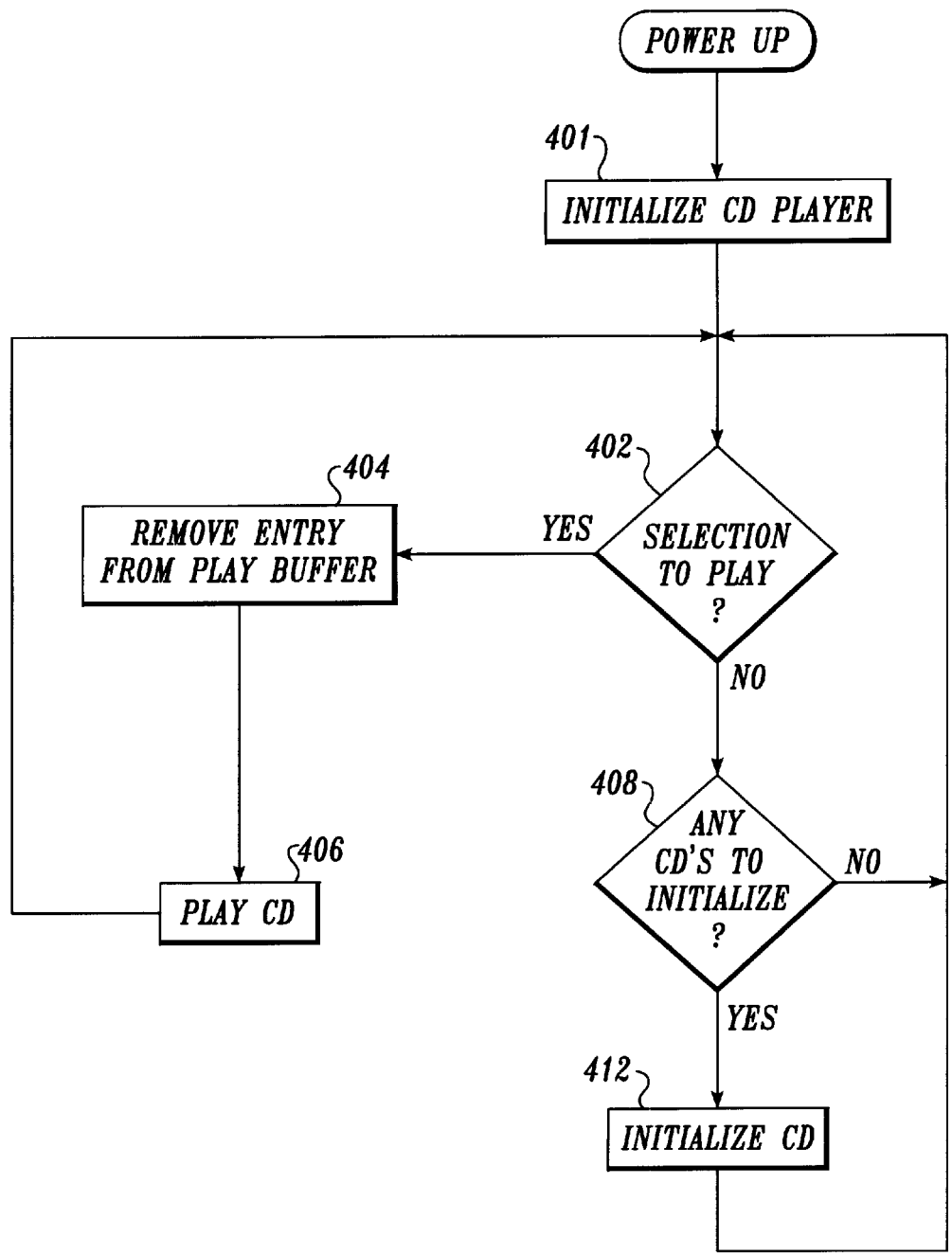
FIG. 4 is a flow diagram illustrating the processing within a normal play module in accordance with the invention.

FIG. 4 illustrates the processing that occurs within the controller computer as directed by the normal play module 110 (FIG. 1) upon power-up of the system. At a step 401, the controller computer 108 initializes the CD player 104. As discussed above, the controller computer includes battery backed-up RAM that contains information pertaining to all of the CDs in the system. Specifically, the CD index buffer 120 contains the number of audio tracks on each normal audio CD in a CD slot. The sequence CD table 302 contains the sequence ID number for every sequence CD in a CD slot. Typical CD players 104, and in particular, the exemplary Phillips CDM3 CD player, do not store information pertaining to individual CDs in battery backed-up RAM. The CD player 104 includes in its memory a table containing information pertaining to each CD in a CD slot. This information, however, is lost when the system power is shut off. At the step 401, the normal play module merges the information from the CD index buffer 120 and the sequence CD table 302, and sends the combined information over the serial line 106 to the CD player 104.

The following "player initialization" command format is utilized when sending this information to the exemplary Phillips CDM3 CD player:

06 01 7E 5C 36 t1$_1$ t2$_1$ t1$_2$ t2$_2$ . . . t1$_n$ t2$_n$ . . . t1$_{99}$ t2$_{99}$ 03 16 where t1$_n$ and t2$_n$ are the ASCII codes for the two digits that make up the two-digit value representing the number of audio tracks in the CD that is positioned within CD slot number n. Each of the numeric values, as shown above, is a hexadecimal number within a respective byte of the command.

When a sequence CD is found in the sequence CD table 302, the sequence ID number, as found in the sequence ID field 310a–c, is inserted in the player initialization command in the track number position corresponding to the CD slot number. For example, in the sequence CD table 302 depicted in FIG. 3, the track number corresponding to CD slot number four placed in the player initialization command will be the value 60, as retrieved from the sequence ID field 310a having the corresponding CD slot number field 308a with a value of 4.

If the CD index buffer 120 contains a value of zero in an entry corresponding to a CD slot number, and there is no entry in the sequence CD table 302 for that CD slot number, then ASCII zeros (30, 30) are placed in the corresponding position in the above player initialization command sent to the CD player. Upon receiving the above command, the CD player 104 builds a table containing the number of audio tracks for each normal audio CD and the sequence ID for each sequence CD. Since the CD player 104 is controlled by commands from the controller computer 108, the CD player does not need to distinguish a normal audio CD from a sequence CD.

At a step 402, a test is made to determine whether a selection to play exists. This determination is made by examining the play queue 118. If any valid entries exist within the play queue 118, then there is a selection to play. If, at the step 402, there is a selection to play, at a step 404, the first entry in the play queue, which is the entry corresponding to the selection to be played, is removed from the play queue. As discussed above, the play queue is preferably implemented as a circular sequential list, and removing the first entry from the play queue includes incrementing the pointer so that it points to the second entry.

At a step 406, the CD player 104 plays the selection to be played. Playing the selection includes sending a command from the normal play module 110 to the CD player 104 over the serial line 106. The command includes values representing the desired CD slot 206$a$–$f$ (FIG. 2) and a desired audio track on the CD within the specified slot. The Phillips CDM3 CD player specifies the format of this command, which is described in further detail below. Other manufacturers and models of CD players have documented command lists, which may differ. After playing the CD, the processing loops back to the step 402 to determine whether another CD selection is ready to play.

If, at the step 402, a determination is made that there is no selection to play, at a step 408, a test is made to determine whether there are any CDs that need to be initialized. A preferable method of indicating that one or more CDs need to be initialized is to utilize an initialization table 116 (FIG. 1) having one entry for each CD slot, where the association between the initialization table entry and the corresponding CD slot is determined by the sequential position of the entry in the initialization table 116. A value, such as zero, in an initialization table entry indicates that the CD in the corresponding CD slot does not need initialization. A second value, such as a non-zero value, in the initialization table entry indicates that the CD in the corresponding CD slot requires initialization. The service module 112 (FIG. 1) sets the initialization table entries to indicate that initialization is required for a CD, in response to an action performed by an operator, such as installation of a new CD. The normal play module clears the value in the initialization table entry when the corresponding CD is initialized. If there are no CDs to initialize, the processing loops back to repeat the test at the step 402. If, at the step 408, there exist one or more CDs that need to be initialized, at a step 412, the CD is initialized, as discussed in further detail below. After initializing the CD, the processing loops back to the step 402.

Preferably, the service module 112 and the sequence interrupt handler 114 execute asynchronously with the operation of the normal play module 110. That is, at any time during the operation of the normal play module the service module 112 may set an entry in the initialization table to indicate that a CD requires initialization. Similarly, the sequence interrupt handler 114 may add a new entry to the play queue 118 during the playing of a CD. Therefore, the test at the step 402 to determine whether there is a selection to play or the test at the step 408 to determine whether any CDs require initialization may result in a positive determination on any loop through the processing illustrated in FIG. 4.

Figure 5:
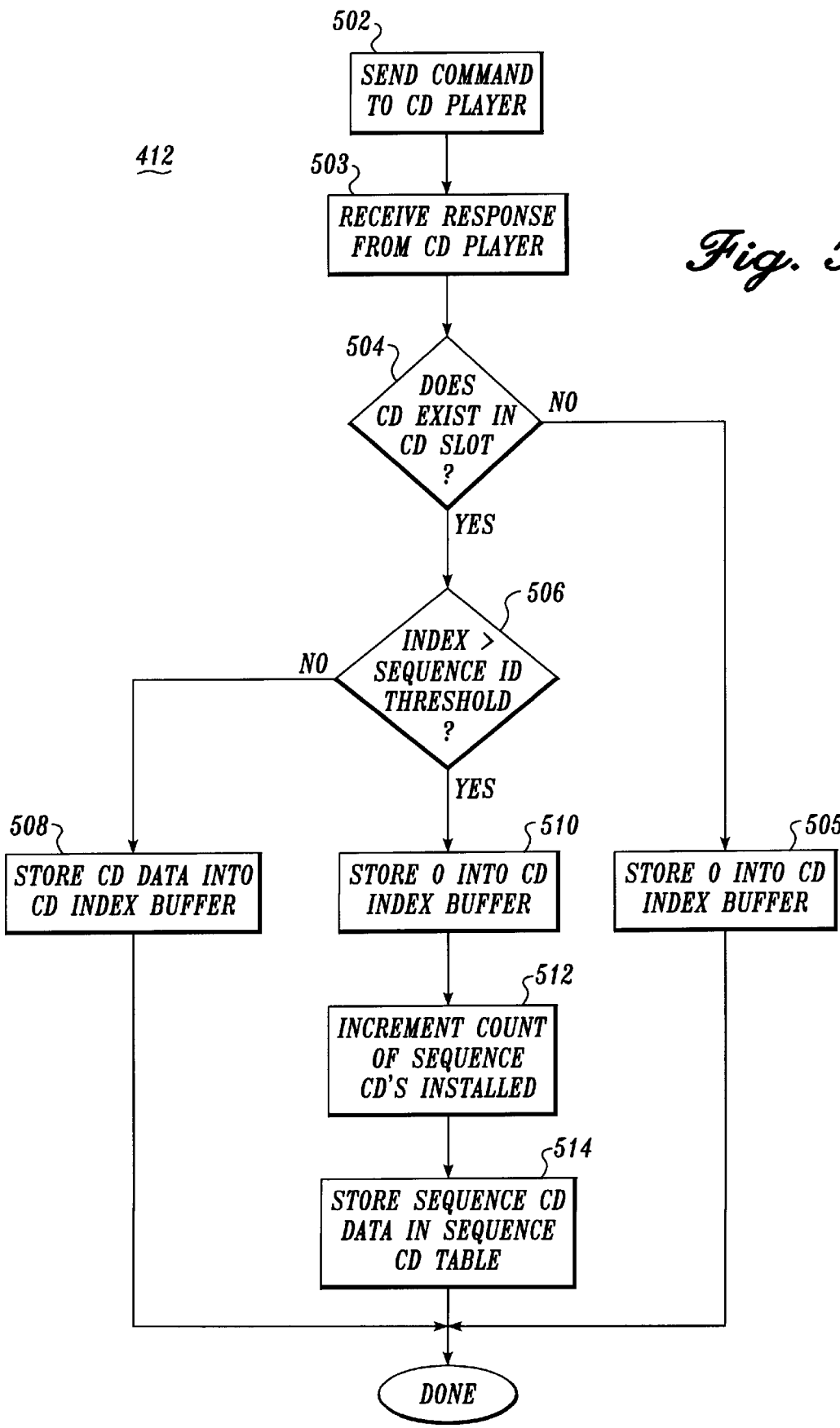
FIG. 5 is a flow diagram illustrating the process of initializing a CD in accordance with the invention.

FIG. 5 illustrates in further detail the processing that occurs as part of the step 412 of initializing a CD. Prior to describing FIG. 5, an explanation of CD indices and a sequence ID threshold is provided.

Audio CDs contain, in addition to audio data, information that describes the contents of the audio CDs. This information includes a CD audio track index, which indicates the number of audio tracks, or audio segments, included on the CD. The information also includes data that describes the duration and starting position of each audio track. Industry standard recording processes receive, as input, a collection of audio tracks to be imprinted on an audio CD. Part of the standard recording process involves writing the information, including the number of audio tracks, on each audio CD. An industry standard, known as the "Compact Disc-Digital Audio (CD-DA) Standard," defines the recorded format of a compact disc and a specific communications protocol between the CD player 104 and interconnected devices such as the controller computer. The CD-DA standard is specified in the International Electrotechnical Commission (IEC) document IEC 908:1987, available from the American National Standards Institute, of New York. The protocol allows external devices to control operation of the CD audio player. The protocol also allows an external device to query the CD audio player for the CD audio track index on a selected audio CD. According to the CD-DA standard, the CD audio track index is the only digital information that can be obtained by an external device interfacing with a CD player.

In accordance with the present invention, sequence CDs are identified by storing a value in the position of the CD audio track index on the sequence CD. Specifically, the value used to identify a sequence CD is a numeric value greater than a threshold value, wherein the threshold value is greater than or equal to the highest number of audio tracks that can exist on normal audio CDs. In terms of the invention, this threshold value is referred to as the sequence ID threshold. By evaluating whether a CD audio track index value on an audio CD exceeds the sequence ID threshold, the method of the present invention determines whether a CD is a sequence CD or a normal audio CD.

A preferable method of recording a CD audio track index for a sequence CD includes creating a total number of audio tracks equal to the desired CD audio track index, or sequence ID. One or more audio tracks may be blank, in order to create the correct total number of audio tracks. Using the method allows the invention to format sequence CDs according to the industry standard recording process, discussed above, writing the total number of audio tracks onto the audio CD in the standard position for the CD audio track index. In this manner, the invention economically employs standard recording processes to create sequence CDs, which are differentiated from normal CDs by the value stored as the audio track index (i.e., the number of tracks indicated as being included on the CD).

Turning now to FIG. 5, the step 412 of initializing a CD begins by reading a CD audio track index from the CD. Reading the CD audio track index includes a step 502 of sending a command, referred to as an index query, from the normal play module in the controller computer to the CD player 104, and a step 503 of receiving a response from the CD player. The index query and the response are transmitted over the serial line 106. The index query that is sent at the step 502 has a format that is particular to the CD player, and may vary among different models of CD players. The Phillips CDM3, which is employed in the currently preferred embodiments of the invention, employs a seven-byte index query of the following form:

01 60 43 d1 d2 03 28

As shown above, each byte of the index query is a hexadecimal number. The fourth and fifth bytes, shown above as d1 and d2, contain the ASCII code for the first digit of the disc slot number, and the ASCII code for the second digit of the slot number, respectively. The remaining values in the index query are fixed or predetermined command codes. For example, the following command instructs the CD player to read the disc in CD slot number five:

01 60 43 30 35 03 28 where "30" is the hexadecimal ASCII code for zero, and "35" is the hexadecimal ASCII code for five.

The CD player, in response to the index query, returns one of two responses. For example, with respect to the Phillips CDM3 CD player, if the CD player does not find a disc at the location designated by the initialize command, the following command is returned:

02 60 60 43 d1 d2 03 41 where d1 and d2 represent the CD slot number designated in the index query. For example, the following response to the above exemplary index query indicates that a disc was not found at CD slot number five:

02 60 60 43 30 35 03 41

If the Phillips CDM3 CD player finds a disc within the designated CD slot, the CD player returns the following command:

02 60 60 42 d1 d2 t1 t2 30 31 03 x where d1 and d2 represent the CD slot number, as described above, and t1 and t2 are the ASCII codes for the two digits that make up the two-digit value representing the number of audio tracks in the designated CD. The last byte of the response, designated by "x" above, does not have a fixed value. The method of the present invention, therefore disregards this byte when examining the response. For example, in response to the above index query, the CD player may return the following command:

02 60 60 42 30 35 32 33 30 31 03 x

The above response indicates that a disc exists within CD slot number 05, and that the disc contains 23 audio tracks, since the ASCII codes 32 and 33 represent the digits two and three, respectively.

At a step 504, the normal play module evaluates the received command, and a test is made to determine whether a CD exists in the specified CD slot. If, at the step 504, a CD does not exist in the CD slot, the normal play module stores a value of zero into the CD index buffer entry 204*a–f* corresponding to the specified CD slot. Initialization processing for the specified CD slot is thereafter complete.

If, at the step 504, a CD exists in the designated CD slot, at a step 506, a test is made to determine whether the CD is a sequence CD. Specifically, this test is performed by determining whether the CD audio track index exceeds the CD sequence ID threshold. In the currently preferred embodiments of the invention, the sequence ID threshold has a value of 59, which allows for audio CDs with up to 59 audio tracks. If, at the step 506, the CD audio track index value is found to not exceed the sequence ID threshold, at a step 508, the CD audio track index value is stored into the CD index buffer 120 (FIG. 2) in the entry 204*a–f* corresponding to the designated CD slot number. Upon storing the CD index buffer at the step 508, the process of initializing a CD is complete.

If, at the step 506, the CD audio track index is found to exceed the sequence ID threshold, at a step 510, a value of zero is stored in the CD index buffer 120 at the entry 204*a–f* corresponding to the designated CD slot number. As discussed above, a value of zero indicates that a normal audio CD does not exist within the CD slot corresponding to the entry (i.e., the CD slot is empty or contains a sequence CD).

At a step 512, the sequence CD count field 304 (FIG. 3) within the sequence CD table 302 is incremented by one to indicate that an additional sequence CD is installed. At a step 514, data pertaining to the sequence CD is stored in an entry 306*a–c* of the sequence CD table 302. Specifically, the number of the CD slot containing the sequence CD is stored in the CD slot number field 308*a–c*, and the CD audio track index value is stored in the sequence ID field 310*a–c*. Upon storing the sequence CD data in the sequence ID buffer, the process of initializing the sequence CD is complete.

Figure 6:
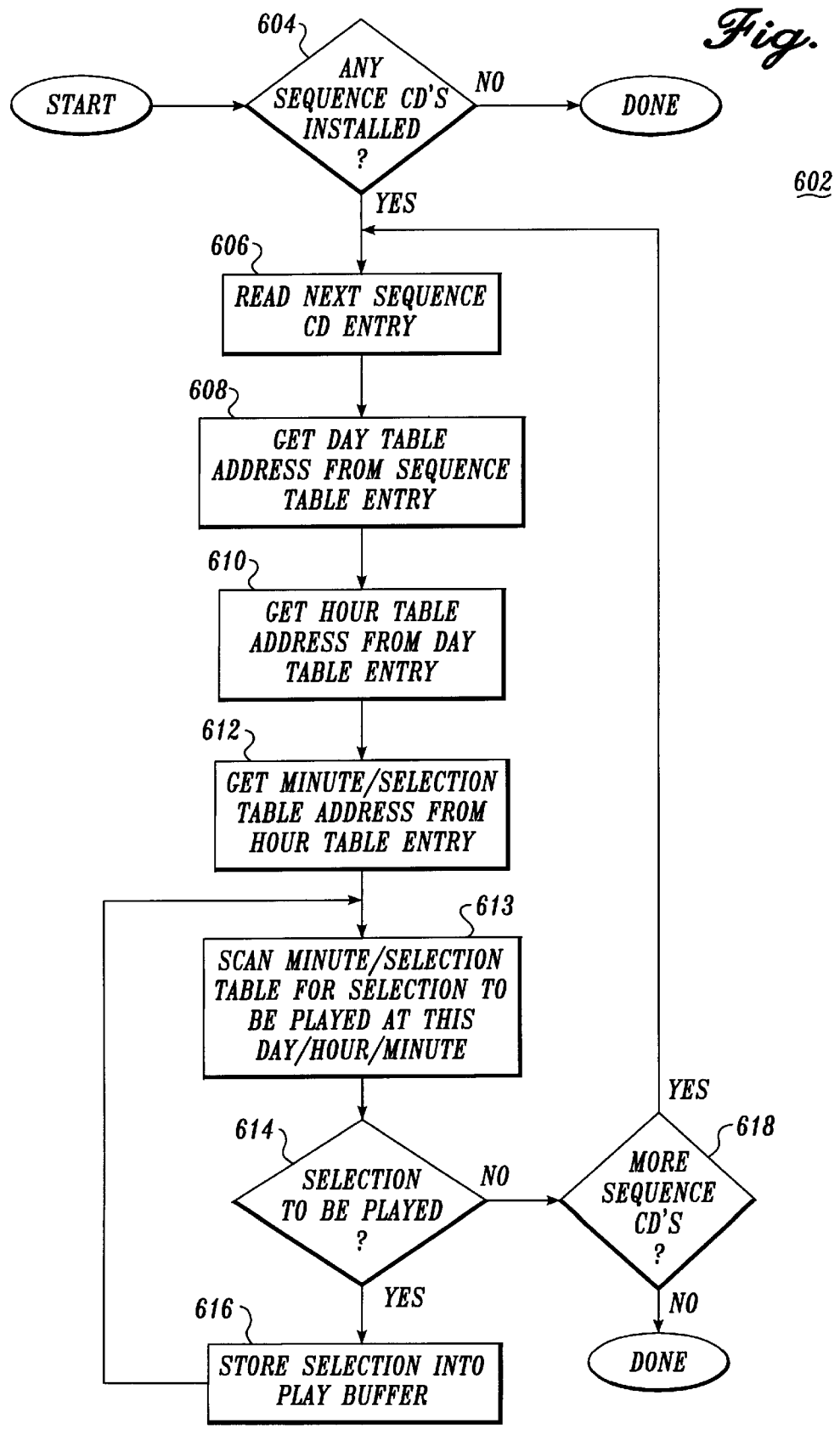
FIG. 6 is a flow diagram illustrating the processing within a sequence interrupt handler in accordance with the invention.

Concurrently with the processing by the normal play module 110, as described above, the system periodically triggers a sequence interrupt. Preferably, the control computer 108 (FIG. 1) includes a battery backed-up real-time clock component 122, such as the RTC 72421 clock chip, manufactured by Fox Electronics of Fort Meyers, Fla. In accordance with the invention, the clock component 122 is initialized to periodically generate a sequence interrupt. The currently preferred period between sequence interrupts is 60 seconds. When a sequence interrupt is triggered, the sequence interrupt handler 114 is invoked. FIG. 6 illustrates the processing 602 that occurs within the sequence interrupt handler 114 each time a sequence interrupt is triggered.

At a step 604 a test is made to determine whether any sequence CDs are installed in the system. This test is performed by examining the sequence CD count field 304 within the sequence CD table 302 (FIG. 3). A non-zero value indicates that at least one sequence CD is installed. If no sequence CDs are installed, as indicated by a zero value in the sequence CD count field 304, processing of the sequence interrupt is complete.

If at least one sequence CD is installed, the sequence interrupt handler 114 enters a loop, beginning at the first sequence CD entry 306*a* of FIG. 3. The loop begins at a step 606, where the next sequence CD entry 306*a* is read. Specifically, the sequence ID field 310*a* within the first sequence CD entry 306*a* is extracted and used to locate a corresponding day table reference field 336*a–d* in the sequence table 322. At a step 608, the information within the day table reference field 336*a–d* is read. This provides a reference, or address to, a day table 324 and 330 corresponding to the sequence ID specified in the sequence ID field 310*a*.

At a step 610, the sequence interrupt handler obtains the proper hour table address from the hour table reference field 338*a–c* of the day table 324 and 330. This step includes determining, from the system clock component 120, the current day of the week, and locating an entry within the day table 324 and 330 corresponding to the current day of the week.

Having a reference, such as an address, to an hour table 326 and 332, at a step 612, the sequence interrupt handler obtains an address of a minute/selection table 328 and 334 from the hour table 326 and 332. This step includes obtaining, from the system clock component 120, the present hour of the day, and using this information to locate the proper minute/selection table reference field 340*a–c* within the hour table 326 and 332. For example, a time between midnight and one o'clock a.m. indicates that the first entry in the hour table, e.g., the entry corresponding to the twelve o'clock a.m. hour, contains a reference to the proper minute/selection table.

Having located the proper minute/selection table 328 and 334, the sequence interrupt handler scans the minute/selection table for a selection to be played, at a step 613. This step includes obtaining, from the system clock component, the present number of minutes past the hour, and locating a selection entry 344a–c corresponding to the minutes value.

At a step 614, a test is made to determine whether one of the selection entries 344a–c corresponds to the present time, and therefore that a sequence CD selection is to be played. If a sequence CD selection is to be played, at a step 616, the sequence interrupt handler stores the selection into the play queue 118 (FIG. 1). This step includes extracting the track field 348a–c from the selection entry 344a–c corresponding to the selection to be played. The sequence interrupt handler 114 stores the CD slot number, obtained from the CD slot number field 308a–c in the sequence CD table 302, and the track number, obtained from the track field 348a–c in the minute/selection table 328 and 334 into the play queue 118. Processing then loops back to step 612, where scanning of the minute/selection table continues, to find any additional entries corresponding to the present number of minutes past the hour. In this manner, a plurality of selections may exist corresponding to a particular minute of the day. As discussed above, new CD audio segments inserted into the play queue 118 are placed at the beginning of the queue. Therefore, if more than one selection entry 344a–c corresponding to the current minute of the day exists, they will be entered into the play queue 118 in the reverse order that they exist in the minute/selection table 328 and 334.

If, at the step 614, a sequence CD selection to be played is not found, at a step 618, the sequence interrupt handler examines the sequence CD table 302 to determine if another sequence CD exists. If one is found, the processing loops back to the step 606 where the next sequence CD entry 306a–c is read, and the searching of the sequence specification tables 320 corresponding to the sequence CD is performed. If, at the step 618, no more sequence CDs exist, the processing of the sequence interrupt is complete.

Referring now to FIG. 3, an exemplary processing of a sequence interrupt by the sequence interrupt handler 114 is discussed. In the following example, it is assumed that the current day and time are Sunday at 1:40 a.m. The first entry 306a within the sequence CD table 302 is read and the value of 60 within the sequence ID field 310a indicates that the corresponding sequence CD utilizes sequence number 60. At the entry for sequence 60 within the sequence table 322, the contents of the day table reference field 336a provide the address of the corresponding day table 324. The hour table reference field 338a corresponding to Sunday provides the address to the hour table 326 for Sunday. Within the hour table 326, the minute/selection table reference field 340b corresponding to one o'clock a.m. provides the address of the minute/selection table 328 corresponding to the one o'clock a.m. time slot. Scanning the minute/selection table, the sequence interrupt handler 114 locates a selection entry 344b corresponding to 40 minutes past the hour. The track field 348b within the selection entry 344b indicates that track seven of the sequence CD is scheduled to be played at this time. Returning to the entry 306a corresponding to the sequence CD, the value of four within the CD slot number field 308a provides the CD slot number for the sequence CD. The CD slot number/track number combination of four/seven is inserted at the front of the queue in the play queue 118.

A similar processing is then performed for the sequence CD corresponding to the entry 306b in the sequence CD table 302, which is associated with a sequence number 61. Although not indicated on FIG. 3, the processing sequence includes the same series of steps to determine whether a track of the associated sequence CD is to be played at the current day and time. Next, processing of the entry 306c is performed. The entry 306c indicates that CD slot number 18 is a sequence CD having sequence number 60. Since the sequence ID field 310c of the entry 306c specifies that sequence 60 is to be used, the processing follows the same traversal of tables as described above for the entry 306a. This results in a new entry inserted at the front of the queue in the play queue 118, the entry having a value of 18 in the CD slot number field 212a, and a value of 7 in the track number field 214a.

As will be readily apparent to one skilled in this art, and others, the above described sequence specification tables 320 can be modified, or tables added, to include additional scheduling information. For example, a table similar to the day table can be used to schedule audio segments according to individual months of the year. Alternatively, ranges of dates can be added to the sequence specification tables to indicate that a minute/selection table 328 and 334 is to be employed between specified dates of a year. This would allow, for example, audio tracks on a sequence CD to be scheduled around holidays, seasons, or other annual events. These audio tracks could then be scheduled to play annually, between the specified dates of each year.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An audio compact disc for storing a plurality of audio tracks, the audio compact disc including a CD audio track index location storing a CD audio track index value for access by an audio compact disc player, wherein the CD audio track index value is a numeric value indicative of the number of audio tracks stored on the audio compact disc and also indicative of a predetermined schedule for playing at least one of the audio tracks.

2. The audio compact disc of claim 1, wherein the CD audio track index value is a numeric value between 60 and 99 inclusive.

3. The audio compact disc of claim 1, wherein the predetermined schedule specifies a plurality of times of day, each time of day corresponding to an audio track on the audio compact disc and indicative of a time to play the corresponding audio track.

4. The audio compact disc of claim 1, wherein the predetermined schedule specifies a plurality days of a week, each day of a week corresponding to at least one audio track on the audio compact disc and indicative of a day of a week to play the corresponding at least one audio track.

5. The audio compact disc of claim 1, wherein the audio compact disc player that accesses the CD audio track index value is of the type that provides the CD audio track index value to an external device in response to a command signal sent from the external device to the audio compact disc player, and wherein the CD audio track index value is a numeric value indicative of the number of audio tracks stored on the audio compact disc and also is indicative of a predetermined schedule for playing at least one of the audio tracks.

6. The audio compact disc of claim 5, wherein the external device contains instructions for determining whether the audio compact disc includes a CD audio track index value indicative of a predetermined schedule for playing at least one of the audio tracks.

7. The audio compact disc of claim 5, wherein the external device includes a storage device having the predetermined schedule stored thereon.

8. The audio compact disc of claim 7, wherein the storage device has a plurality of predetermined schedules stored thereon, and wherein the CD audio track index value specifies one of the plurality of predetermined schedules.

9. The audio compact disc of claim 5, wherein the external device includes instructions for:

determining, based upon a current time of day and the CD audio track index value, whether at least one audio track on the audio compact disc is scheduled to be played at approximately the current time of day; and, if so, sending a scheduled play command to the audio player, the scheduled play command instructing the audio player to play the at least one audio track that is scheduled to play at approximately the current time of day.

10. The audio compact disc of claim 5, wherein at least one of the audio tracks is blank.

11. An audio compact disc for storing a plurality of audio tracks, the audio compact disc including a CD audio track index location storing a CD audio track index value for access by an audio compact disc player of the type that provides the CD audio track index value to an external device in response to a command signal sent from the external device to the audio compact disc player, wherein the CD audio track index value is a numeric value indicative of a predetermined schedule for automatically playing at least one of the audio tracks.

12. The audio compact disc of claim 11, wherein the predetermined schedule specifies a plurality of times of day, each time of day corresponding to an audio track on the audio compact disc and indicative of a time to play the corresponding audio track.

13. The audio compact disc of claim 11, wherein the external device includes a storage device having the predetermined schedule stored thereon.

14. The audio compact disc of claim 13, wherein the storage device has a plurality of predetermined schedules stored thereon, and wherein the CD audio track index value specifies one of the plurality of predetermined schedules.

15. The audio compact disc of claim 11, wherein the external device includes instructions for:

determining, based upon a current time of day and the CD audio track index value, whether at least one audio track on the audio compact disc is scheduled to be played at approximately the current time of day; and, if so, sending a scheduled play command to the audio player, the scheduled play command instructing the audio player to play the at least one audio track that is scheduled to play at approximately the current time of day.

16. An audio compact disc comprising:

a plurality of audio tracks;

means for specifying a predetermined schedule for playing at least one of the audio tracks.

17. The audio compact disc of claim 16, further comprising means for specifying the number of audio tracks stored on the audio compact disc.

* * * * *